United States Patent
Saiki (10) Patent No.: US 9,506,747 B2
(45) Date of Patent: Nov. 29, 2016

(54) INSPECTION METHOD FOR SHEET DETECTION DEVICE, SHEET DETECTION DEVICE, AND INSPECTION APPARATUS

(71) Applicant: KYOCERA Document Solutions Inc., Osaka-shi, Osaka (JP)

(72) Inventor: Katsushi Saiki, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 78 days.

(21) Appl. No.: 14/668,753

(22) Filed: Mar. 25, 2015

(65) Prior Publication Data

US 2015/0276384 A1    Oct. 1, 2015

(30) Foreign Application Priority Data

Mar. 27, 2014  (JP) ................................. 2014-066771

(51) Int. Cl.
*G01B 11/14* (2006.01)
*G01B 9/00* (2006.01)
*G03G 15/00* (2006.01)
*H04N 1/00* (2006.01)

(52) U.S. Cl.
CPC ................. *G01B 11/14* (2013.01); *G01B 9/00* (2013.01); *G03G 15/55* (2013.01); *G03G 15/607* (2013.01); *H04N 1/0075* (2013.01); *H04N 1/00681* (2013.01); *H04N 1/00726* (2013.01); *G03G 2215/00324* (2013.01); *G03G 2215/00616* (2013.01)

(58) Field of Classification Search
USPC ............................................... 356/600–640
See application file for complete search history.

(56) References Cited

U.S. PATENT DOCUMENTS 4,662,738 A * 5/1987 Kasuya .............. G03G 15/5025
  271/258.01
4,777,496 A * 10/1988 Maejima ................ H04N 1/506
  101/463.1

(Continued)

FOREIGN PATENT DOCUMENTS

EP     0590533 A1    4/1994
EP     1372044 A2   12/2003

(Continued)

OTHER PUBLICATIONS

European Patent Office, Extended European Search Report Issued in Application No. 15160810.6, Aug. 14, 2015, Germany, 10 pages.

*Primary Examiner* — Tarifur Chowdhury
*Assistant Examiner* — Jarreas C Underwood
(74) *Attorney, Agent, or Firm* — Alleman Hall McCoy Russell & Tuttle LLP (57) ABSTRACT

A control portion of a sheet detection device causes a light emitter to emit a predetermined amount of light emission, to determine whether or not a first reference sheet is in a detection area. When the first reference sheet is not in the area, a sheet detection sensor is moved upward by a predetermined movement pitch. When the first reference sheet is in the area, the present detection distance between the sheet detection sensor and the first reference sheet is stored. The same process is performed for the second reference sheet. When both of the detection distances are correct, the control portion determines that an output from the sheet detection sensor is correct, and sets the amount of light emission for a document detection process. When both of the detection distances are incorrect, the amount of light emission from the light emitter is increased by one step.

6 Claims, 6 Drawing Sheets

(56) References Cited

U.S. PATENT DOCUMENTS

| | | | |
|---|---|---|---|
| 4,975,747 A * | 12/1990 | Higuchi | G03G 15/5037 399/49 |
| 6,400,912 B1 | 6/2002 | Tanaka et al. | |
| 7,869,047 B2 * | 1/2011 | Henderson | G03G 15/5062 356/445 |
| 8,849,132 B2 * | 9/2014 | Henderson | G03G 15/0178 399/38 |
| 2013/0258329 A1 * | 10/2013 | Higuchi | G01N 21/8806 356/237.4 |

FOREIGN PATENT DOCUMENTS

| | | |
|---|---|---|
| JP | 10178551 A | 6/1998 |
| JP | 2005067088 A | 3/2005 |

* cited by examiner

INSPECTION METHOD FOR SHEET DETECTION DEVICE, SHEET DETECTION DEVICE, AND INSPECTION APPARATUS

INCORPORATION BY REFERENCE

This application is based upon and claims the benefit of priority from the corresponding Japanese Patent Application No. 2014-066771 filed on Mar. 27, 2014, the entire contents of which are incorporated herein by reference.

BACKGROUND

The present disclosure relates to an inspection technique for sheet detection devices including reflective optical sensors for detecting sheets such as documents and print sheets that are conveyed or placed in image processing apparatuses such as image forming apparatuses and image reading apparatuses.

For image processing apparatuses such as multifunction peripherals and copying machines, a reflective optical sensor is used for detecting a size of a document to be read or determining whether or not a document is in a predetermined detection area. The reflective optical sensor applies light to a document to be detected, and receives light reflected by the document. The received-light signal is outputted as an output signal from the reflective optical sensor, and is used for detecting the size of the document or determining whether or not the document is in the predetermined detection area.

The output signal from the reflective optical sensor varies according to an image density in a document to be detected, and a distance to the document. That is, the brighter the image in the document to be detected is, the greater a value of the output signal from the reflective optical sensor is. Further, the less a distance between the reflective optical sensor and the document to be detected is, the greater the value of the output signal therefrom is.

SUMMARY

An inspection method for a sheet detection device according to one aspect of the present disclosure is an inspection method for inspecting a sheet detection device that determines whether or not a sheet is in a detection area based on comparison between an output from a reflective optical sensor that outputs a signal according to an image density of the sheet to be detected and a distance to the sheet, and a predetermined threshold value. The inspection method includes a first step, a second step, and a third step. In the first step, the sheet detection device is caused to perform a detection operation for a reference sheet while changing a distance between the reflective optical sensor and the reference sheet having a predetermined image density, and detecting a distance between the reflective optical sensor and the reference sheet when a sheet detection signal indicating that the reference sheet is detected is outputted by the sheet detection device. In the second step, whether or not a detection distance detected in the first step is equal to a predetermined reference value, is determined. In the third step, an amount of light emission from a light emitter in the reflective optical sensor is changed when the detection distance detected in the first step is determined, in the second step, as being unequal to the reference value. The first step, the second step, and the third step are repeated until the detection distance detected in the first step is determined, in the second step, as being equal to the reference value.

A sheet detection device according to another aspect of the present disclosure includes a sheet detection portion, a support portion, a driving portion, a first control portion, a second control portion, a distance detection portion, and a determination portion. The sheet detection portion is configured to determine whether or not a sheet is in a detection area, based on comparison between an output from a reflective optical sensor that outputs a signal according to an image density of the sheet to be detected and a distance to the sheet, and a predetermined threshold value. The support portion is configured to support the reflective optical sensor such that the reflective optical sensor is movable in an approaching direction and a retreating direction relative to the sheet. The driving portion is configured to drive the reflective optical sensor in the approaching direction and the retreating direction. The first control portion is configured to cause the driving portion to change a distance between the sheet and the reflective optical sensor. The second control portion is configured to control an amount of light emission from a light emitter in the reflective optical sensor. The distance detection portion is configured to operate such that, according to control by the first control portion and the second control portion, the sheet detection portion performs a detection operation for a reference sheet while changing a distance between the reflective optical sensor and the reference sheet having a predetermined image density, and to detect a distance between the reflective optical sensor and the reference sheet when a sheet detection signal indicating that the reference sheet is detected is outputted by the sheet detection portion. The determination portion is configured to determine whether or not a detection distance detected by the distance detection portion is equal to a predetermined reference value. The second control portion changes an amount of light emission from the light emitter when the determination portion determines that the detection distance detected by the distance detection portion is unequal to the reference value, and repeatedly changes an amount of light emission until the determination portion determines that the detection distance detected by the distance detection portion is equal to the reference value.

An inspection apparatus according to still another aspect of the present disclosure is an inspection apparatus capable of communicating with a sheet detection device that includes: a reflective optical sensor that outputs a signal according to an image density of a sheet to be detected, and a distance to the sheet; a support portion that supports the reflective optical sensor such that the reflective optical sensor is movable in an approaching direction and a retreating direction relative to the sheet; and a driving portion that drives the reflective optical sensor in the approaching direction and the retreating direction, and that determines whether or not the sheet is in a detection area, based on comparison between an output from the reflective optical sensor and a predetermined threshold value, the inspection apparatus inspecting the sheet detection device. The inspection apparatus includes a first control portion, a second control portion, a distance detection portion, and a determination portion. The first control portion is configured to cause the driving portion to change a distance between the sheet and the reflective optical sensor. The second control portion is configured to control an amount of light emission from a light emitter in the reflective optical sensor. The distance detection portion is configured to operate such that, according to control by the first control portion and the second control portion, the sheet detection device performs a detection operation for a reference sheet while changing a distance between the reflective optical sensor and the reference sheet having a predetermined image density, and to detect a distance between the reflective optical sensor and the reference sheet when a sheet detection signal indicating that the reference sheet is detected is outputted by the sheet detection device. The determination portion is configured to determine whether or not a detection distance detected by the distance detection portion is equal to a predetermined reference value. The second control portion changes an amount of light emission from the light emitter when the determination portion determines that the detection distance detected by the distance detection portion is unequal to the reference value, and repeatedly changes an amount of light emission until the determination portion determines that the detection distance detected by the distance detection portion is equal to the reference value.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. The embodiment described below represents an exemplary implementation of the present disclosure, and the technical scope of the present disclosure is not limited by the embodiment described below.

Figure 1:
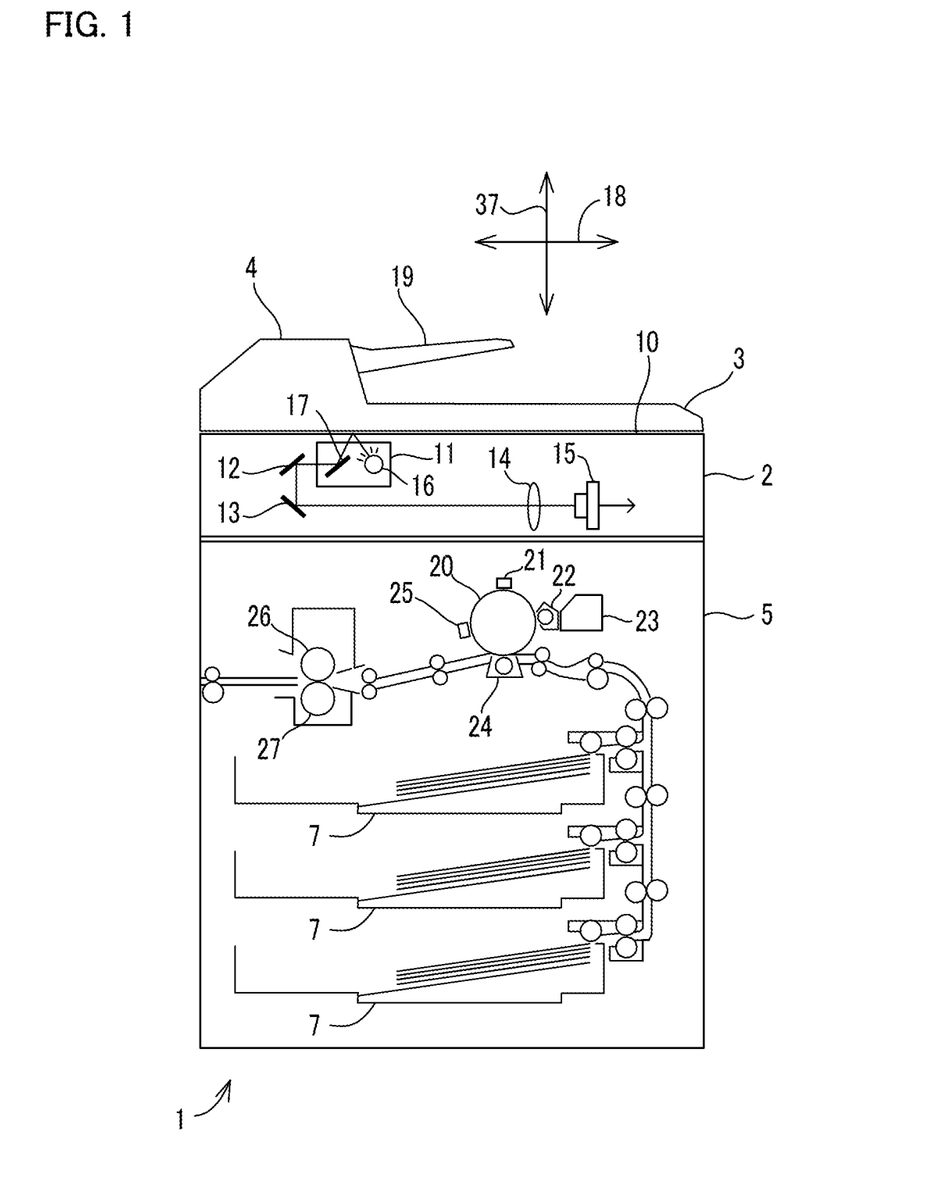
FIG. 1 is a schematic diagram of an internal configuration of an image processing apparatus according to one embodiment of the present disclosure.

Initially, with reference to FIG. 1 and FIG. 2, a schematic configuration of an image processing apparatus 1 according to an embodiment of the present disclosure will be described. The image processing apparatus 1 is a multifunction peripheral that includes an image reading function, a facsimile function, an image forming function, and the like. As shown in FIG. 1, the image processing apparatus 1 includes an image reading portion 2, a document cover 3, an automatic document feeding device (Auto Document Feeder; hereinafter, referred to as an ADF) 4, an image forming portion 5, an operation display portion 6 (see FIG. 2), a sheet feed cassette 7, a communication interface (I/F) portion 8 (see FIG. 2), and a control portion 9 (see FIG. 2) that controls the above components. As an exemplary image processing apparatus of the present disclosure, the image processing apparatus 1 that is a multifunction peripheral will be described. However, the image processing apparatus of the present disclosure is not limited thereto, and may be implemented as, for example, a printer, a facsimile device, a copying machine, or a scanner device.

The image reading portion 2 executes an image reading process for reading image data from a document. As shown in FIG. 1, the image reading portion 2 includes a contact glass 10 (glass plate), a reading unit 11, mirrors 12, 13, an optical lens 14, a Charge Coupled Device (CCD) 15, and the like.

The reading unit 11 includes an LED light source 16 and a mirror 17, and can be moved in a sub-scanning direction 18 (the left-right direction in FIG. 1) by a movement mechanism (not shown) using a driving motor such as a stepping motor. When the reading unit 11 is moved in the sub-scanning direction 18 by the driving motor, light applied from the LED light source 16 toward the contact glass 10 provided on the upper surface of the image reading portion 2 is scanned in the sub-scanning direction 18.

When light is applied from the LED light source 16, the mirror 17 reflects, toward the mirror 12, light reflected by a document or a rear surface of the document cover 3. The light reflected by the mirror 17 is guided to the optical lens 14 through the mirrors 12, 13. The optical lens 14 focuses the incident light on the CCD 15.

The CCD 15 is a photoelectric converter that converts the received light into an electric signal (voltage) according to an amount of the received light (intensity of brightness), to output the electric signal to the control portion 9. The control portion 9 generates image data of a document by subjecting the electric signal from the CCD 15 to image processing. In the present embodiment, an exemplary case where the CCD 15 is used as an imaging device is described. However, instead of the reading mechanism using the CCD 15, a reading mechanism that includes a contact image sensor (CIS) having a focal length shorter than the CCD 15 may be used.

To the image reading portion 2, the document cover 3 is pivotably mounted. By the document cover 3 being operated to pivot, the contact glass 10 on the upper surface of the image reading portion 2 is opened or closed. In a pivoting support portion of the document cover 3, a cover-opening detection sensor (not shown) such as a limit switch is provided. When a user opens the document cover 3 such that an image of a document is read, the cover-opening detection sensor is actuated to output a detection signal (cover-opening detection signal) to the control portion 9.

The image reading portion 2 reads an image of a document in the following procedure. Firstly, the document is placed on the contact glass 10, and the document cover 3 is then put into a closed position. Thereafter, when an image reading instruction is inputted through the operation display portion 6, one line of light is sequentially applied continuously from the LED light source 16 while the reading unit 11 is being moved rightward in the sub-scanning direction 18. Light reflected by the document or the rear surface of the document cover 3 is guided to the CCD 15 through the mirrors 17, 13, and 14, and the optical lens 14, and light amount data based on an amount of light received by the CCD 15 is sequentially outputted to the control portion 9. When light amount data for the entirety of the area to which light has been applied is obtained, the control portion 9 processes the light amount data, to generate image data of the document based on the light amount data.

The ADF 4 is provided in the document cover 3. The ADF 4 sequentially feeds documents set on a document set portion 19, by means of a plurality of feed rollers, and moves the document rightward in the sub-scanning direction 18 through an automatic document reading position defined on the contact glass 10. When the document is moved by the ADF 4, the reading unit 11 is positioned below the automatic document reading position, and an image of the document being moved is read by the reading unit 11 at this position.

As shown in FIG. 1, the image forming portion 5 executes an image forming process (printing process) by electrophotography. The image forming portion 5 executes the image forming process according to image data read by the image reading portion 2 or a printing job inputted through the communication I/F portion 8 from an external information processing apparatus such as a personal computer. Specifically, the image forming portion 5 includes a photosensitive drum 20, a charging portion 21, a developing portion 22, a toner container 23, a transfer roller 24, an electricity removing portion 25, a fixing roller 26, a pressure roller 27, and the like. In the present embodiment, the image forming portion 5 using electrophotography, is illustrated. However, the image forming portion 5 is not limited to an image forming portion using electrophotography, and may be an image forming portion using an inkjet recording mode, or an image forming portion using another recording mode or printing mode.

In the image forming portion 5, an image forming process on a print sheet fed from the sheet feed cassette 7 is performed in the following procedure. Firstly, when a printing job including a print instruction is inputted through the communication I/F portion 8, the photosensitive drum 20 is uniformly charged at a predetermined potential by the charging portion 21. Subsequently, light based on image data included in the printing job is applied to the surface of the photosensitive drum 20 by a laser scanner unit (not shown). Thus, an electrostatic latent image is formed on the surface of the photosensitive drum 20. The electrostatic latent image on the photosensitive drum 20 is developed (visualized) into a toner image by the developing portion 22. Toner (developer) is additionally supplied to the developing portion 22 from the toner container 23. Subsequently, the toner image formed on the photosensitive drum 20 is transferred to the print sheet by the transfer roller 24. Thereafter, the toner image having been transferred to the print sheet is heated and fused by the fixing roller 26, to be fixed onto the print sheet, when the print sheet passes between the fixing roller 26 and the pressure roller 27 and is discharged. Potential of the photosensitive drum 20 is removed by the electricity removing portion 25.

Figure 2:
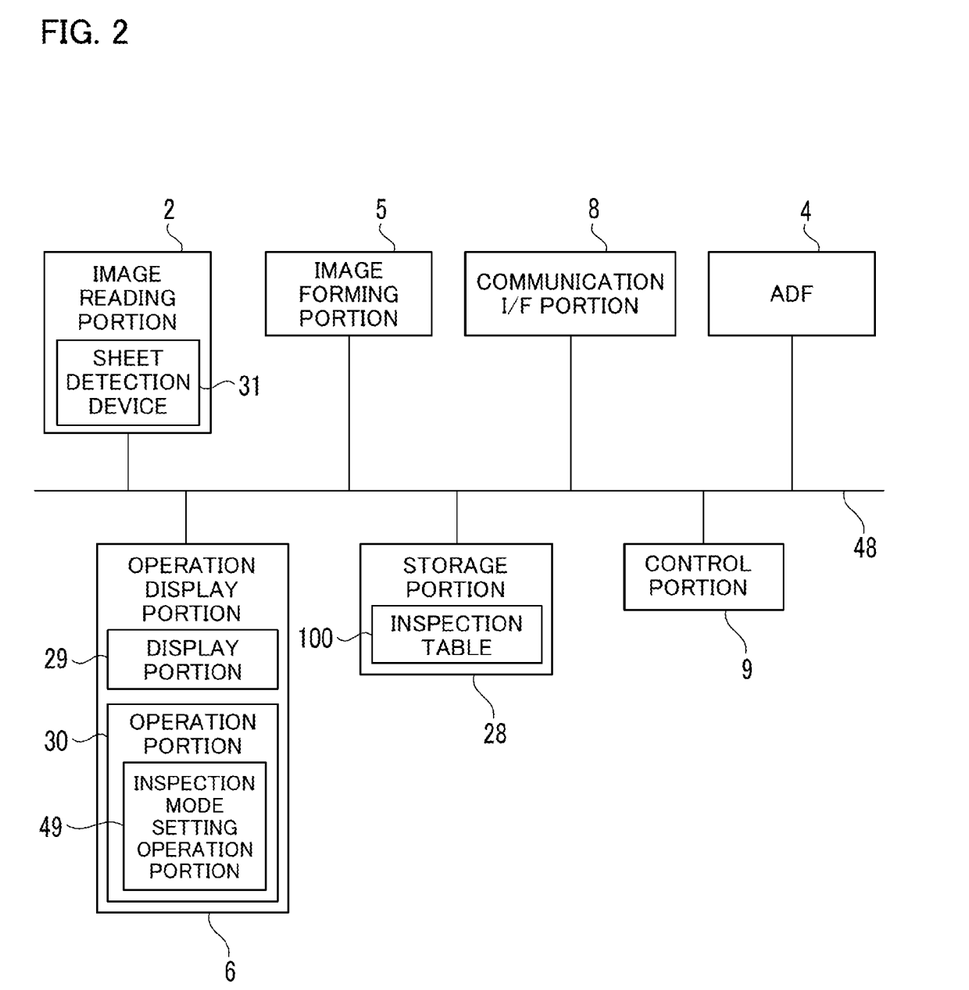
FIG. 2 is a block diagram illustrating an exemplary electrical configuration of the image processing apparatus.

In FIG. 2, the communication I/F portion 8 is an interface that executes data communication with an external device connected to the image processing apparatus 1 via a communication network such as the Internet or a LAN. A storage portion 28 is implemented as a non-volatile memory such as a hard disk drive. In the storage portion 28, an inspection table 100 described below is previously stored.

The operation display portion 6 includes a display portion 29 and an operation portion 30. The display portion 29 is implemented as, for example, a color liquid crystal display, and displays various information to a user that operates the operation display portion 6. The operation portion 30 is implemented as various push button keys disposed adjacent to the display portion 29, a touch panel sensor disposed on a display screen of the display portion 29, and the like. To the operation portion 30, various instructions are inputted by a user of the image processing apparatus 1.

Figure 3:
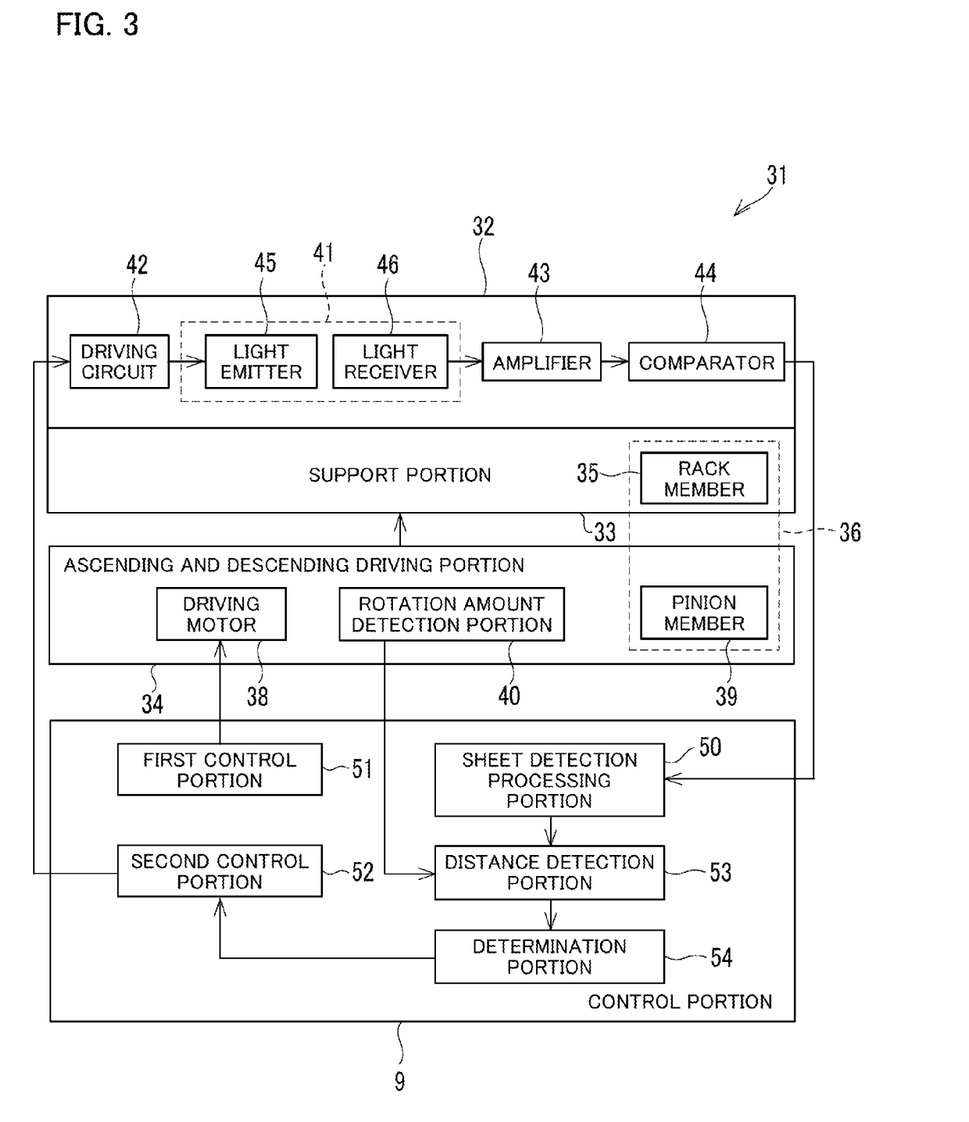
FIG. 3 illustrates a characteristic portion of the image processing apparatus.

The image reading portion 2 includes a sheet detection device 31. As shown in FIG. 3, the sheet detection device 31 includes a sheet detection unit 32, a support portion 33, and an ascending and descending driving portion 34. The sheet detection unit 32 is an example of a sheet detection portion. The sheet detection unit 32 is mounted at a predetermined position below the contact glass 10 on which a document is placed, and detects a sheet in a predetermined detection area. The sheet detection unit 32 will be described below in detail. The ascending and descending driving portion 34 is an example of a driving portion of the present disclosure.

The support portion 33 supports the sheet detection unit 32 such that the sheet detection unit 32 is movable in an approaching direction and a retreating direction relative to a sheet placed on the contact glass 10. The support portion 33 includes a support base 47 (see FIG. 4) on which the sheet detection unit 32 is mounted, and a rack member 35 that is a component of a rack and pinion mechanism 36. The sheet detection unit 32 is fixed to and supported by the support base 47. The support base 47 is connected to the rack member 35 that extends in a normal direction 37 (the up-down direction of the image processing apparatus 1; see FIG. 1) that is normal to the contact glass 10.

The ascending and descending driving portion 34 includes: a driving motor 38 such as a stepping motor; a pinion member 39 that is a component of the rack and pinion mechanism 36; and a rotation amount detection portion 40. The driving motor 38 is a motor that can be driven to rotate in two directions, that is, forward and backward, and drives rotation of the pinion member 39. The pinion member 39 meshes with the rack member 35. Drive force from the driving motor 38 is transmitted to the support base 47 of the support portion 33 through the rack and pinion mechanism 36 including the pinion member 39 and the rack member 35.

When drive current is supplied to the driving motor 38, the driving motor 38 generates drive force. The pinion member 39 rotates due to the drive force. When the pinion member 39 rotates, the rack member 35 that meshes with the pinion member 39 moves upward or downward relative to the image processing apparatus 1. Since the support base 47 is connected to the rack member 35, the support base 47 also slides upward or downward. Therefore, the sheet detection unit 32 fixed to the support base 47 slides upward or downward (ascends or descends). That is, the ascending and descending driving portion 34 moves the sheet detection unit 32 in the approaching direction and the retreating direction relative to the contact glass 10 and a sheet placed on the contact glass 10.

The rotation amount detection portion 40 is implemented as, for example, a well-known rotary encoder, and detects a rotation amount of a drive shaft (not shown) of the driving motor 38. An output signal from the rotation amount detection portion 40 is used for detecting a distance between the sheet and the sheet detection unit 32 (a light emitter 45 described below), specifically, a distance in the direction normal to the contact glass 10, as described below. In the following description, the distance between the sheet and the sheet detection unit 32 represents a distance in the direction normal to the contact glass 10.

The sheet detection unit 32 includes a sheet detection sensor 41, a driving circuit 42, an amplifier 43, and a comparator 44.

Figure 4:
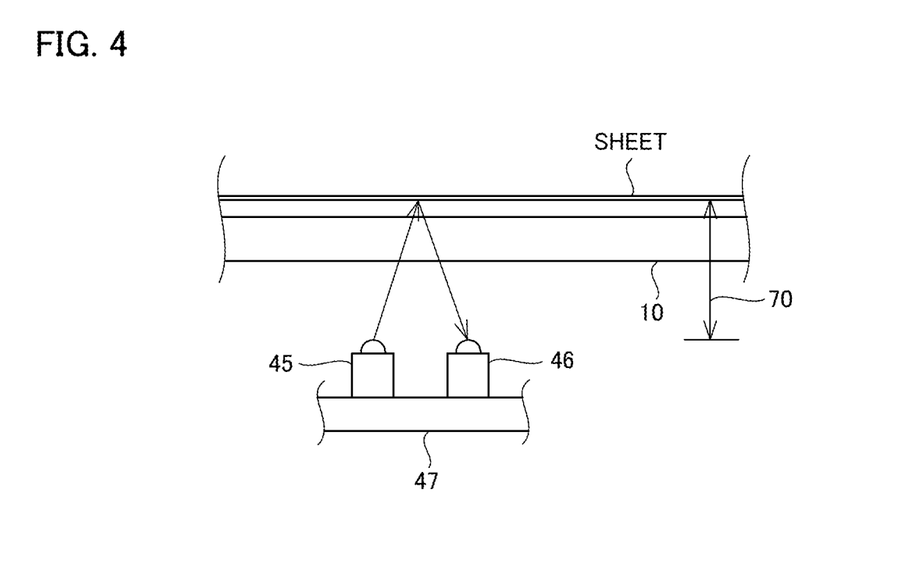
FIG. 4 illustrates a manner in which a sheet detection sensor is disposed.

The sheet detection sensor 41 is a reflective optical sensor that includes the light emitter 45 that has, for example, a light emitting diode, and a light receiver 46 that has, for example, a phototransistor. As shown in FIG. 4, the sheet detection sensor 41 is mounted below the contact glass 10 having a surface (upper surface) on which a document is placed. Therefore, the sheet detection sensor 41 detects a sheet through the contact glass 10. That is, the light emitter 45 of the sheet detection sensor 41 applies light to a sheet in the detection area through the contact glass 10. The light receiver 46 receives, through the contact glass 10, light reflected by the sheet due to the light application. An amount of received light in the light receiver 46 depends on a distance to the sheet. Further, the amount of received light also depends on an image density in the sheet. The light receiver 46 outputs a signal according to an amount of received light. An output signal from the light receiver 46 becomes an output signal from the sheet detection sensor 41. When no sheet is in the detection area, no reflected light is received by the light receiver 46. Therefore, an output from the sheet detection sensor 41 represents zero.

The driving circuit 42 generates current to be supplied to the light emitter 45 of the sheet detection sensor 41 based on power supplied from a power supply (not shown), and supplies the generated current to the light emitter 45. The driving circuit 42 is able to vary a magnitude of current to be generated, according to a control signal from a second control portion 52 of the control portion 9. The light emitter 45 emits light with an amount of light emission based on the magnitude of the current supplied from the driving circuit 42. That is, an amount of light emission from the light emitter 45 can be controlled by the control portion 9.

The amplifier 43 amplifies the output signal outputted by the light receiver 46 with a predetermined amplification factor. The comparator 44 compares the output signal outputted by the amplifier 43, with a predetermined threshold value, and outputs a signal representing the comparison result. That is, when the output signal from the amplifier 43 is higher than the threshold value, the comparator 44 outputs a HIGH signal. When the output signal from the amplifier 43 is lower than the threshold value, the comparator 44 outputs a LOW signal. The output signal representing the comparison result is outputted to the control portion 9. As described below, a sheet detection processing portion 50 of the control portion 9 determines whether or not a sheet is in the detection area, based on the output signal outputted by the comparator 44.

The control portion 9 includes a Central Processing Unit (CPU), a Read Only Memory (ROM), and a Random Access Memory (RAM). The CPU is a processor that executes various calculation processes. The ROM is a non-volatile storage portion in which information such as control programs for causing the CPU to execute various processes is previously stored. The RAM is a volatile storage portion which is used as a temporary storage memory (work area) for various processes executed by the CPU. The control portion 9 controls operations of various components by the CPU executing the programs stored in the ROM.

In the image processing apparatus 1, the image reading portion 2, the image forming portion 5, the operation display portion 6, the communication I/F portion 8, the storage portion 28, and the control portion 9 are connected to each other via a data bus 48 so as to perform data input and output among the components.

The operation portion 30 includes an inspection mode setting operation portion 49 (see FIG. 2) that allows an operator to perform an operation for setting the image processing apparatus 1 so as to be in an inspection mode described below. The inspection mode is a mode in which whether or not an output from the sheet detection unit 32 is correct, is determined in an inspection, and when the output is not correct, the output is corrected.

In the present embodiment, in order to determine in the inspection whether or not an output from the sheet detection sensor 41 is correct, two kinds of reference sheets having different image densities are used. The two kinds of reference sheets are referred to as a first reference sheet and a second reference sheet. Image densities in the first reference sheet and the second reference sheet, respectively, are predefined. In the inspection, the reference sheets are placed on the contact glass 10 one by one.

When a mode setting operation is performed, for setting of the inspection mode, by the inspection mode setting operation portion 49, the control portion 9 sets the image processing apparatus 1 so as to be in the inspection mode. The image processing apparatus 1 in the inspection mode corresponds to an inspection apparatus of the present disclosure. The control portion 9 includes the sheet detection processing portion 50, a first control portion 51, the second control portion 52, a distance detection portion 53, and a determination portion 54, which are associated with the inspection mode.

The sheet detection processing portion 50 performs a document detection process for determining whether or not a document is in the detection area, based on the output signal outputted by the comparator 44. That is, the sheet detection processing portion 50 determines that a sheet is in the detection area, when receiving a HIGH signal from the comparator 44. The sheet detection processing portion 50 determines that no sheet is in the detection area, when receiving a LOW signal from the comparator 44.

The first control portion 51 controls the driving motor 38 mounted to the ascending and descending driving portion 34, to change a distance between a sheet and the sheet detection sensor 41 by means of the ascending and descending driving portion 34. That is, the first control portion 51 changes a driving direction of rotation of the driving motor 38, to change moving directions in which the support portion 33 and the sheet detection sensor 41 are moved. The first control portion 51 rotates the driving motor 38 forward, whereby the support portion 33 and the sheet detection sensor 41 can be moved upward. On the other hand, the first control portion 51 rotates the driving motor 38 backward, whereby the support portion 33 and the sheet detection sensor 41 can be moved downward.

A predetermined position in a range in which the sheet detection sensor 41 is movable, is set to a home position of the sheet detection sensor 41 in the inspection. For the inspection, the first control portion 51 controls the driving motor 38 to position the sheet detection sensor 41 at the home position. The first control portion 51 performs a movement control so as to move the sheet detection sensor 41 upward from the home position with a predetermined movement pitch until the sheet detection processing portion 50 detects the presence of a document. Further, when the determination portion 54 determines that an output from the sheet detection unit 32 is not correct as described below, the first control portion 51 returns the sheet detection sensor 41 to the home position and then performs the movement control. As described below, each time the movement control is repeatedly performed, an amount of light emission from the light emitter 45 is changed.

The second control portion 52 controls the driving circuit 42 to control an operation performed by the light emitter 45 in the sheet detection sensor 41. That is, the second control portion 52 controls current to be supplied from the driving circuit 42 to the light emitter 45, to switch a light emitting operation of the light emitter 45 between on and off, or change an amount of light emission from the light emitter 45.

The distance detection portion 53 detects a distance 70 (see FIG. 4) between the sheet detection sensor 41, and each of the first reference sheet and the second reference sheet placed on the contact glass 10. The distance detection portion 53 obtains, from the rotation amount detection portion 40, information about an amount of rotation of the pinion member 39. A relationship between the amount of rotation of the pinion member 39 and a moving distance of the sheet detection sensor 41 is predefined. Further, a distance between the home position and the reference sheet placed on the contact glass 10 is previously stored in the storage portion 28. Therefore, by a moving distance of the sheet detection sensor 41 from the home position being detected, a distance between the sheet detection sensor 41 and the reference sheet can be detected. When the first reference sheet is detected, a detection distance detected by the distance detection portion 53 is referred to as a first detection distance. When the second reference sheet is detected, a detection distance detected by the distance detection portion 53 is referred to as a second detection distance.

The ascending and descending driving portion 34 is controlled by the first control portion 51, and light emission from the light emitter 45 is controlled by the second control portion 52. Thus, as described below, while a distance between the first reference sheet and the sheet detection sensor 41 is being changed, an operation for detecting for the first reference sheet is performed by the sheet detection unit 32. The distance detection portion 53 detects the first detection distance when the sheet detection processing portion 50 determines that a document is in the detection area. The determination portion 54 determines whether or not the first detection distance is equal to a predetermined first reference value.

The distance detection portion 53 similarly performs, for the second reference sheet, a series of processes as performed for the first reference sheet. That is, the distance detection portion 53 operates to control the first control portion 51 and the second control portion 52 such that, while a distance between the second reference sheet and the sheet detection sensor 41 is being changed, an operation for detecting for the second reference sheet is performed by the sheet detection unit 32. The distance detection portion 53 detects the second detection distance when the sheet detection processing portion 50 determines that a document is in the detection area. The determination portion 54 determines whether or not the second detection distance is equal to a predetermined second reference value.

Figure 5:
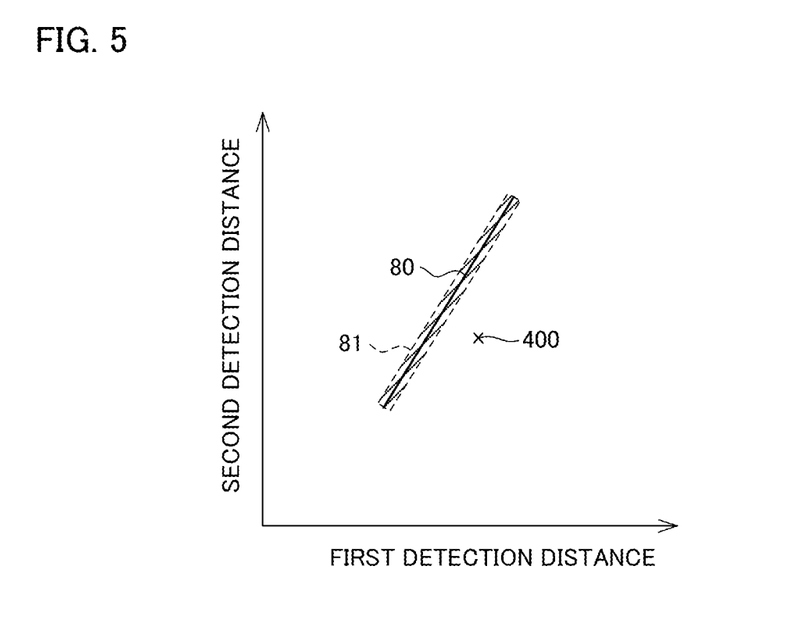
FIG. 5 is a graph showing a two-dimensional coordinate system in which a first detection distance and a second detection distance are variables, and combinations of reference values for the first detection distance and reference values for the second detection distance.

In the present embodiment, the first reference value and the second reference value indicate distances represented by coordinates on a predetermined straight line 80 in a two-dimensional coordinate system in which the first detection distance and the second detection distance are variables, as shown in FIG. 5. As shown in FIG. 2, an inspection table 100 representing combinations of reference values for the first detection distance and reference values for the second detection distance, which correspond to coordinates on the straight line 80, is previously stored in the storage portion 28.

The determination portion 54 determines whether or not the combination of the first detection distance and the second detection distance is predefined in the inspection table 100. In other words, the determination portion 54 determines whether or not a coordinate point corresponding to the combination of the first detection distance and the second detection distance detected by the distance detection portion 53 represents a coordinate on the straight line 80. When the determination portion 54 determines that the combination of the first detection distance and the second detection distance is defined in the inspection table 100 (a coordinate point corresponding to the combination of the first detection distance and the second detection distance represents a coordinate on the straight line 80), it is determined that the output from the sheet detection unit 32 is correct. When the determination portion 54 determines that the combination of the first detection distance and the second detection distance is not defined in the inspection table 100 (a coordinate point corresponding to the combination of the first detection distance and the second detection distance does not represent a coordinate on the straight line 80), it is determined that the output from the sheet detection unit 32 is not correct. FIG. 5 illustrates an example of a coordinate point 400 obtained when the determination portion 54 determines that the output from the sheet detection unit 32 is not correct. In the present embodiment, although the reference values for the first detection distance and the second detection distance correspond to coordinate points on the straight line 80, predetermined allowable errors may be set for the reference values. That is, reference values corresponding to coordinate points in a predetermined area 81 (see FIG. 5) including the straight line 80 in the two-dimensional coordinate system may be used as the reference values for the first detection distance and the second detection distance.

When the determination portion 54 determines that the output from the sheet detection unit 32 is not correct, the second control portion 52 changes an amount of light emission from the light emitter 45. In the present embodiment, the second control portion 52 can change current to be supplied to the light emitter 45 by the driving circuit 42, stepwise by a predetermined amount. Therefore, an amount of light emission from the light emitter 45 can be changed stepwise. Each time the determination portion 54 determines that the output from the sheet detection unit 32 is not correct, the second control portion 52 increases an amount of light emission from the light emitter 45 by one step. When the determination portion 54 determines that the output from the sheet detection unit 32 is correct, the second control portion 52 stops controlling the amount of light emission, and sets the amount of light emission obtained at that time, as an amount of light emission in a normal state (for detecting a document). As described above, in the present embodiment, only when both the first detection distance and the second detection distance represent the reference values, the amount of light emission in a normal state (for detecting a document) is set.

In the sheet detection sensor 41, even when image densities of documents are the same, or even when distances to the documents are the same, outputs from the sheet detection sensor 41 may be different due to an error. The causes for such a difference due to an error may be various. One of the causes, in a configuration in which the contact glass 10 on which a document is placed is disposed between the sheet detection sensor 41 and the document, is a variation among products due to error in manufacturing the contact glasses 10. That is, in a case where a light transmittance or refractive index is different among the contact glasses 10 due to variation among proudcts as the contact glasses 10, even if the detection operation is performed for documents having the same image density in a state where distances to the documents are the same, amounts of received light in the sheet detection sensor 41 are different. As a result, error in output occurs. In general, the sheet detection sensors 41 are produced on the assumption that the contact glasses 10 as products have the same light transmittance or refractive index. The sheet detection sensors 41 are not produced in consideration of a light transmittance or refractive index being different among the contact glasses 10 due to variation among products as the contact glasses 10. Therefore, outputs from the sheet detection sensors 41 may vary individually depending on the products.

Such an error in output may cause erroneous detection for a document. That is, in a configuration where a document is detected by determining that the document is present when an output from the sheet detection sensor 41 is greater than a predetermined threshold value, in a case where the output from the sheet detection sensor 41 is less than the predetermined threshold value due to the error, it may be erroneously determined that the document is not in the detection area although the document is actually in the detection area.

In the image processing apparatus 1 of the present embodiment, by the control portion 9 performing the process described below, erroneous detection for the document due to error in output from the sheet detection sensor 41 can be prevented or reduced.

Figure 6:
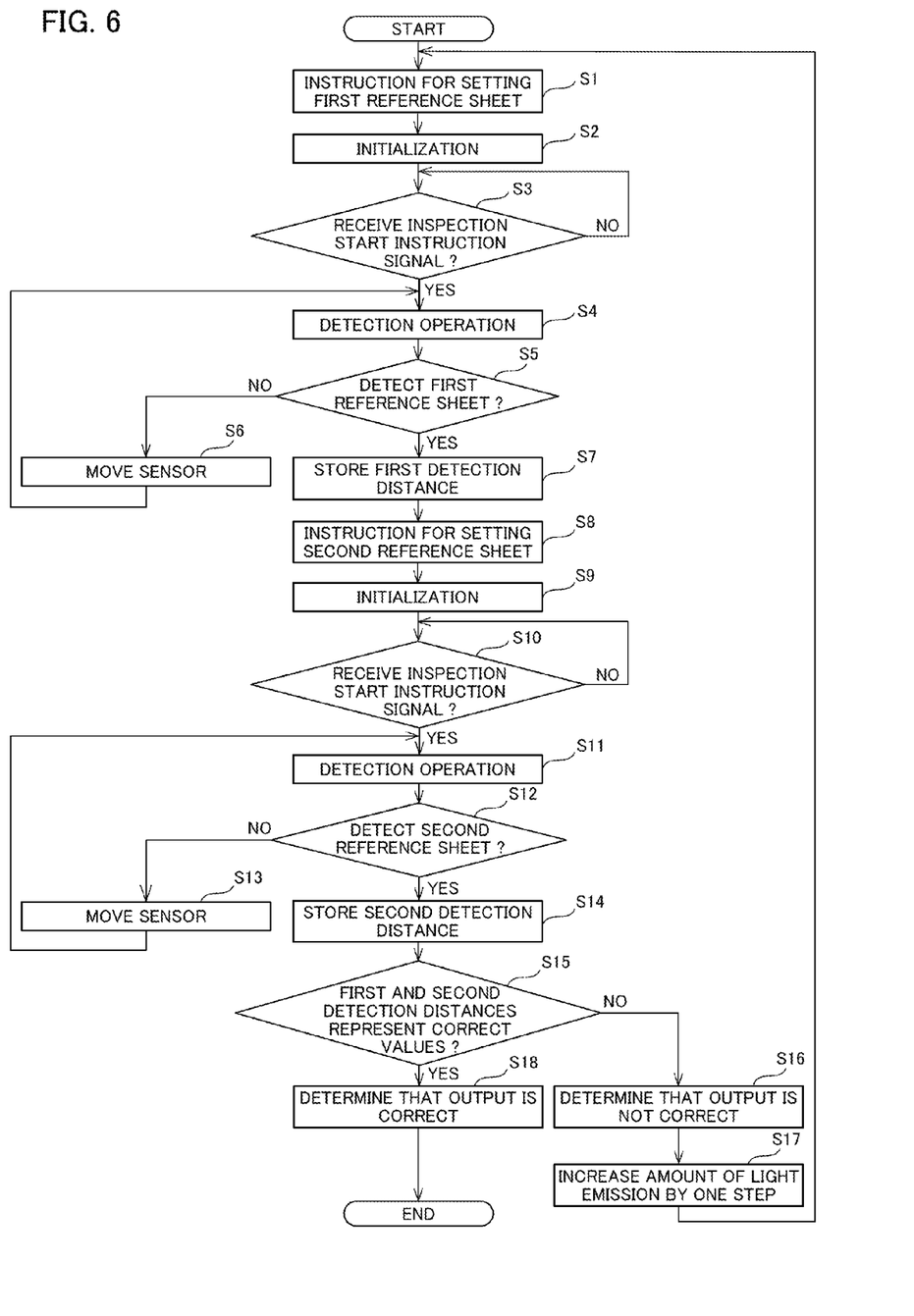
FIG. 6 is a flow chart showing a process performed by a control portion in an inspection mode.

Next, a process performed by the control portion 9 in the inspection mode will be described. FIG. 6 is a flow chart showing a process performed by the control portion 9 in the inspection mode. When the inspection mode setting operation portion 49 is operated, the control portion 9 executes the process to be performed by the control portion 9 in the inspection mode. In the flow chart of FIG. 6, step 51, S2, . . . represent process procedure (step) numbers. The process performed by the control portion 9 in the inspection mode is for implementing an inspection method according to the present disclosure.

As shown in FIG. 6, when the inspection mode setting operation portion 49 is operated, the control portion 9 causes the display portion 29 to display a message representing an instruction for placing the first reference sheet on the contact glass 10 (step Si). Further, the control portion 9 performs initialization for the inspection (step S2). In the initialization, for example, the first control portion 51 moves the sheet detection sensor 41 to the home position, and the second control portion 52 sets an amount of light emission from the light emitter 45 of the sheet detection sensor 41 as a minimum value in a predetermined light emission amount range. The control portion 9 waits for reception of an inspection start instruction signal inputted by an operator (NO in step S3).

In the control portion 9, when the inspection start instruction signal is received (YES in step S3), the second control portion 52 causes the light emitter 45 to emit light with a minimum amount of light emission, and the sheet detection processing portion 50 determines whether or not the first reference sheet is in the detection area, based on a signal outputted by the comparator 44 (step S4). As a result of the determination, when the sheet detection processing portion 50 determines that the first reference sheet is not in the detection area (NO in step S5), the first control portion 51 moves the sheet detection sensor 41 upward by the movement pitch (step S6), and the process is then returned to step S4.

When the sheet detection processing portion 50 determines in step S5 that the first reference sheet is in the detection area (YES in step S5), the control portion 9 detects the present distance (the first detection distance) between the sheet detection sensor 41 and the first reference sheet, and stores the distance in a register (not shown) of the CPU (step S7). The process step of step S7 includes a process of a first step of the present disclosure.

After step S7, the control portion 9 causes the display portion 29 to display a message representing an instruction for placing the second reference sheet on the contact glass 10 (step S8). Further, the control portion 9 performs the initialization (step S9). The control portion 9 waits for reception of the inspection start instruction signal (NO in step S10).

When the control portion 9 receives the inspection start instruction signal (YES in step S10), the control portion 9 performs the same process steps as steps S4 to S7. That is, the second control portion 52 causes the light emitter 45 to emit light with a minimum amount of light emission, and the sheet detection processing portion 50 determines whether or not the second reference sheet is in the detection area, based on the output signal outputted by the comparator 44 (step 511). As a result of the determination, when the sheet detection processing portion 50 determines that the second reference sheet is not in the detection area (NO in step S12), the first control portion 51 moves the sheet detection sensor 41 upward by the movement pitch (step S13), and the process is then returned to step S11.

When the sheet detection processing portion 50 determines in step S12 that the second reference sheet is in the detection area (YES in step S12), the control portion 9 detects the present distance (the second detection distance) between the sheet detection sensor 41 and the second reference sheet, and stores the distance in the register of the CPU (step S14). The process step of step S14 includes a process of the first step of the present disclosure.

The determination portion 54 determines whether or not both the first detection distance and the second detection distance stored in the register of the CPU represent the reference values (whether or not a combination of the first detection distance and the second detection distance is defined in the inspection table 100) (step S15). The process step of step S15 corresponds to a process of a second step of the present disclosure. As a result, when the determination portion 54 determines that at least one of the first detection distance and the second detection distance does not represent the reference value (NO in step S15), it is determined that the output from the sheet detection sensor 41 is not correct (step S16). In response to the determination result, the second control portion 52 increases an amount of light emission from the light emitter 45 by one step (step S17), and the control portion 9 then returns the process to step 51. The process step of step S17 corresponds to a process of a third step of the present disclosure.

When the determination portion 54 determines that both the first detection distance and the second detection distance represent the reference values (YES in step S15), it is determined that the output from the sheet detection sensor 41 is correct (step S18). In response to the determination result, the second control portion 52 sets the present amount of light emission from the light emitter 45, as an amount of light emission for a document detection process, and the control portion 9 ends the process in the inspection mode.

As described above, in the present embodiment, while a distance between the reference sheet and the sheet detection sensor 41 is being changed, the sheet detection sensor 41 performs the detection operation, to detect a distance at which the output from the sheet detection sensor 41 represents the threshold value. Whether or not the detected distance is equal to the predetermined reference value is determined. When the distance is determined as being unequal to the predetermined reference value, an amount of light emission from the light emitter 45 of the sheet detection sensor 41 is increased. A series of process steps described above is repeated until the detection distance at which the output from the sheet detection sensor 41 represents the threshold value, becomes equal to the reference value.

Thus, error generated in the output from the sheet detection sensor 41 is eliminated or reduced, to correct the output. As a result, a document can be assuredly detected.

A document having an image density that is greatly different from that of the reference sheet used for the inspection, may be placed on the contact glass 10. It is assumed that only one kind of reference sheet is used for the inspection. At this time, in a case where the sheet detection sensor 41 and the document are distant from each other over a distance to the reference sheet having been set in the inspection, and light is emitted by the light emitter 45 with an amount of light emission having been set in the inspection, a signal having a value different from the threshold value may be outputted by the sheet detection sensor 41.

On the other hand, in the present embodiment, two kinds of reference sheets (the first reference sheet and the second reference sheet) that are different in image density are used to perform the inspection. Therefore, as compared to a case where only one kind of reference sheet is used to perform the inspection, the output from the sheet detection sensor 41 can be made correct also for documents with different image densities. As a result, documents with different image densities can be assuredly detected. However, the present disclosure is also applicable to a case where one kind of reference sheet is used to perform the inspection. In a case where only one kind of reference sheet is used to perform the inspection, one reference value for a distance between the reference sheet and the sheet detection sensor 41 is used, and the reference value is stored in the storage portion 28. The same process steps as for the above embodiment are performed except that steps S8 to S14 in the flow chart shown in FIG. 6 are omitted, and whether or not the detection distance between the reference sheet and the sheet detection sensor 41 as obtained when the reference sheet is determined as being in the detection area, is equal to the reference value, is determined in step S15.

In a case where three or more kinds of reference sheets are used, the output from the sheet detection sensor 41 can be made correct also when variation in image density among documents is increased. As a result, documents with various image densities can be more assuredly detected.

In the present embodiment, the inspection is performed for the sheet detection sensor 41 that detects a document thruogh the contact glass 10. Therefore, an output from the sheet detection sensor 41 can be corrected even when variation among products as the contact glasses 10 occurs or there is stain or the like as well as the characteristics of the sheet detection sensor 41 itself change with the passage of time.

A preferred embodiment of the present disclosure has been described above. However, the present disclosure is not limited to the contents described above. Various modifications can be made.

The inspection as described above may be performed when the image processing apparatus 1 is being manufactured as well as after the product has been delivered. Thus, variation, among the image processing apparatuses 1, in document detection accuracy of the sheet detection unit 32, can be eliminated or reduced.

Further, in the above embodiment, the inspection is performed for the sensor for detecting documents. However, a subject to be detected by the sensor is not limited to a document. A subject to be detected may be sheets in general, such as a print sheet in an unprinted state or a print sheet in a printed state.

Further, in the above embodiment, the inspection is performed for the sheet detection sensor 41 that detects presence or absence of a document on the contact glass 10. However, a subject to be inspected is not limited to the sheet detection sensor 41. For example, in a case where whether or not a sheet is in a tray (not shown) is detemiend by using the reflective optical sensor, in a case where the reflective optical sensor detects for a document set in the document set portion 19, or in a case where the reflective optical sensor detects for a given or greater number of print sheets in the sheet feed cassette 7, the inspection may be performed for such a sensor in the inspection method of the present disclosure.

Further, in some cases, the image processing apparatus includes, at a predetermined position upstream of the image forming portion, a registration roller for conveying a print sheet to the image forming portion, and a registration sensor for detecting arrival of the print sheet at the registration roller and passing of the print sheet through the registration roller. The registration roller allows the print sheet to be conveyed to the image forming portion according to a time when the image forming operation is performed by the image forming portion. In such an image processing apparatus, the inspection may be performed for the registration sensor in the inspection method of the present disclosure. Further, the inspection may be performed for not only a sensor that detects for sheets that are stationary but also a sensor that detects for sheets which are being conveyed.

Figure 7:
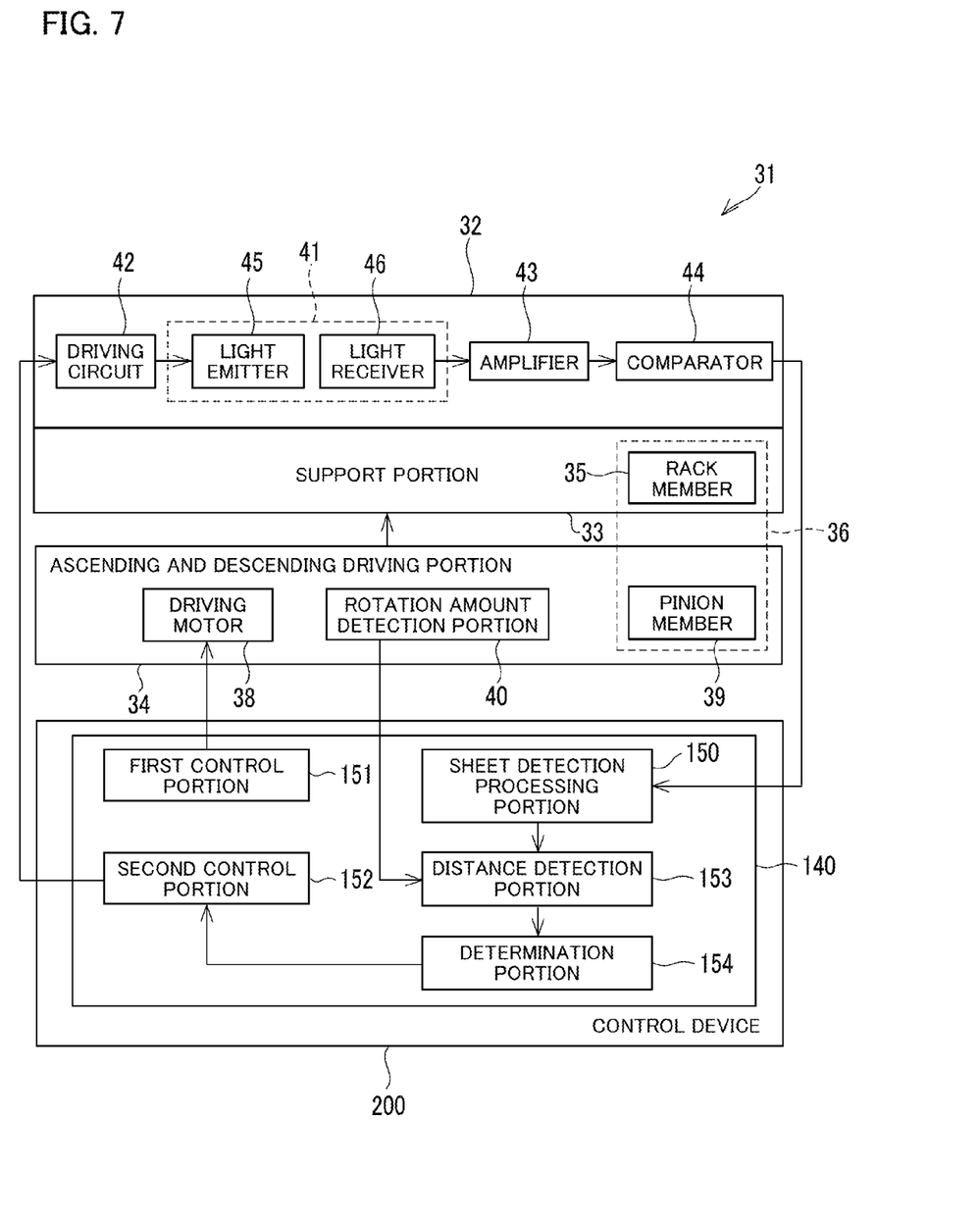
FIG. 7 illustrates a modification of the embodiment according to the present disclosure.

In the above embodiment, the image processing apparatus 1 has the inspection function as described above. However, the present disclosure includes an embodiment where a device which is separate from the image processing apparatus 1 causes the image processing apparatus 1 to perform the inspection as described above, as shown in FIG. 7. In FIG. 7, a control device 200 is shown as the separate device that causes the image processing apparatus 1 to perform the inspection as described above. The control device 200 can perform wired or wireless communication with the image processing apparatus 1. Further, the control device 200 includes a control portion 140, and the control portion 140 includes a sheet detection processing portion 150, a first control portion 151, a second control portion 152, a distance detection portion 153, and a determination portion 154 which are similar to the components 50 to 54, respectively, of the above embodiment. The image processing apparatus 1 is remotely operated to perform the inspection by these components 150 to 154. Also in such a configuration, the same effect as in the above embodiment can be obtained.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An inspection method for a sheet detection device, for inspecting the sheet detection device that determines whether or not a sheet is in a detection area based on comparison between an output from a reflective optical sensor that outputs a signal according to an image density of the sheet to be detected and a distance to the sheet, and a predetermined threshold value, the inspection method comprising:

a first step of causing the sheet detection device to perform a detection operation for a reference sheet while changing a distance between the reflective optical sensor and the reference sheet having a predetermined image density, and detecting a distance between the reflective optical sensor and the reference sheet when a sheet detection signal indicating that the reference sheet is detected is outputted by the sheet detection device;

a second step of determining whether or not a detection distance detected in the first step is equal to a predetermined reference value; and a third step of changing an amount of light emission from a light emitter in the reflective optical sensor when the detection distance detected in the first step is determined, in the second step, as being unequal to the reference value, wherein the first step, the second step, and the third step are repeated until the detection distance detected in the first step is determined, in the second step, as being equal to the reference value.

2. The inspection method for the sheet detection device according to claim 1, wherein the reference sheet includes a first reference sheet and a second reference sheet that have different image densities, respectively, the first, the second, and the third steps are performed for the first reference sheet and the second reference sheet, and the reference value indicates a distance represented by a coordinate on a predetermined straight line in a two-dimensional coordinate system in which a detection distance detected for the first reference sheet and a detection distance detected for the second reference sheet are variables, and whether or not a coordinate point corresponding to a combination of the detection distance, for the first reference sheet, detected in the first step and the detection distance, for the second reference sheet, detected in the first step, represents the coordinate on the straight line, is determined in the second step.

3. A sheet detection device comprising:

a sheet detection portion configured to determine whether or not a sheet is in a detection area, based on comparison between an output from a reflective optical sensor that outputs a signal according to an image density of the sheet to be detected and a distance to the sheet, and a predetermined threshold value;

a support portion configured to support the reflective optical sensor such that the reflective optical sensor is movable in an approaching direction and a retreating direction relative to the sheet;

a driving portion configured to drive the reflective optical sensor in the approaching direction and the retreating direction;

a first control portion configured to cause the driving portion to change a distance between the sheet and the reflective optical sensor;

a second control portion configured to control an amount of light emission from a light emitter in the reflective optical sensor;

a distance detection portion configured to operate such that, according to control by the first control portion and the second control portion, the sheet detection portion performs a detection operation for a reference sheet while changing a distance between the reflective optical sensor and the reference sheet having a predetermined image density, and to detect a distance between the reflective optical sensor and the reference sheet when a sheet detection signal indicating that the reference sheet is detected is outputted by the sheet detection portion; and a determination portion configured to determine whether or not a detection distance detected by the distance detection portion is equal to a predetermined reference value, wherein the second control portion changes an amount of light emission from the light emitter when the determination portion determines that the detection distance detected by the distance detection portion is unequal to the reference value, and repeatedly changes an amount of light emission until the determination portion determines that the detection distance detected by the distance detection portion is equal to the reference value.

4. The sheet detection device according to claim 3, wherein the reference sheet includes a first reference sheet and a second reference sheet that have different image densities, respectively, the distance detection portion and the determination portion perform operations, respectively, for the first reference sheet and the second reference sheet, the reference value indicates a distance represented by a coordinate on a predetermined straight line in a two-dimensional coordinate system in which a detection distance detected for the first reference sheet and a detection distance detected for the second reference sheet are variables, and the determination portion determines whether or not a coordinate point corresponding to a combination of the detection distance, for the first reference sheet, detected by the distance detection portion, and the detection distance, for the second reference sheet, detected by the distance detection portion, represents the coordinate on the straight line.

5. The sheet detection device according to claim 3, wherein the sheet and the reference sheet are conveyed or placed on a surface of a glass plate, and the reflective optical sensor detects the sheet and the reference sheet on a rear surface side of the glass plate.

6. An inspection apparatus capable of communicating with a sheet detection device that includes: a reflective optical sensor that outputs a signal according to an image density of a sheet to be detected, and a distance to the sheet; a support portion that supports the reflective optical sensor such that the reflective optical sensor is movable in an approaching direction and a retreating direction relative to the sheet; and a driving portion that drives the reflective optical sensor in the approaching direction and the retreating direction, and that determines whether or not the sheet is in a detection area, based on comparison between an output from the reflective optical sensor and a predetermined threshold value, the inspection apparatus inspecting the sheet detection device, the inspection apparatus comprising:

a first control portion configured to cause the driving portion to change a distance between the sheet and the reflective optical sensor;

a second control portion configured to control an amount of light emission from a light emitter in the reflective optical sensor;

a distance detection portion configured to operate such that, according to control by the first control portion and the second control portion, the sheet detection device performs a detection operation for a reference sheet while changing a distance between the reflective optical sensor and the reference sheet having a predetermined image density, and to detect a distance between the reflective optical sensor and the reference sheet when a sheet detection signal indicating that the reference sheet is detected is outputted by the sheet detection device; and a determination portion configured to determine whether or not a detection distance detected by the distance detection portion is equal to a predetermined reference value, wherein the second control portion changes an amount of light emission from the light emitter when the determination portion determines that the detection distance detected by the distance detection portion is unequal to the reference value, and repeatedly changes an amount of light emission until the determination portion determines that the detection distance detected by the distance detection portion is equal to the reference value.

* * * * *